US012091030B2

(12) United States Patent
Suzuki et al.

(10) Patent No.: US 12,091,030 B2
(45) Date of Patent: Sep. 17, 2024

(54) DRIVING SUPPORT DEVICE

(71) Applicant: HONDA MOTOR CO., LTD., Tokyo (JP)

(72) Inventors: Kazuasa Suzuki, Saitama (JP); Yuya Kishimoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 17/669,367

(22) Filed: Feb. 11, 2022

(65) Prior Publication Data

US 2022/0315029 A1 Oct. 6, 2022

(30) Foreign Application Priority Data

Mar. 31, 2021 (CN) .......................... 202110344270.4

(51) Int. Cl.
*B60Q 1/00* (2006.01)
*B60K 35/00* (2006.01)
(Continued)

(52) U.S. Cl.
CPC .............. *B60W 50/14* (2013.01); *B60K 35/00* (2013.01); *B60W 10/18* (2013.01); *B60W 10/20* (2013.01);
(Continued)

(58) Field of Classification Search
CPC ...... B60W 50/14; B60W 10/18; B60W 10/20; B60W 30/09; B60W 60/005; B60W 2050/007; B60W 2050/143; B60W 2050/146; B60W 30/16; B60W 30/12; B60W 60/0055; B60K 35/00; B60K 2370/1575; B60K 2370/195;
(Continued)

(56) References Cited

U.S. PATENT DOCUMENTS

2019/0129417 A1 5/2019 Noto et al.
2022/0309839 A1* 9/2022 Kishimoto ............... G07C 5/02
2023/0294723 A1* 9/2023 Katayama ............. B60W 50/16
340/425.5

FOREIGN PATENT DOCUMENTS

JP 2012050690 A 3/2012
JP 2012212351 A 11/2012
(Continued)

OTHER PUBLICATIONS

Notification of Reasons for Refusal issued in the JP Patent Application No. JP2022-058074, mailed on Sep. 19, 2023.

*Primary Examiner* — Toan N Pham
(74) *Attorney, Agent, or Firm* — CKC & Partners Co., LLC

(57) ABSTRACT

A driving support device is provided which can efficiently perform training for driving support. A driving support device (11) is equipped to a vehicle (1), and includes a driving support execution unit (201) capable of executing driving support to control steering and/or braking of the vehicle 1, and executing the driving support when the driver of the vehicle (1) performs a predetermined operation using a predetermined operator provided in the vehicle (1); and a driving support training control unit (202) which executes driving support training processing for the driver of the vehicle (1) to train the predetermined operation, in which the driving support training control unit (202) executes the training support training processing after the vehicle (1) has started up and during vehicle stop.

3 Claims, 4 Drawing Sheets

(51) Int. Cl.
*B60W 10/18* (2012.01)
*B60W 10/20* (2006.01)
*B60W 30/09* (2012.01)
*B60W 50/14* (2020.01)
*B60W 60/00* (2020.01)
B60K 35/26 (2024.01)
B60K 35/29 (2024.01)
B60K 35/60 (2024.01)
B60W 50/00 (2006.01)

(52) U.S. Cl.
CPC .......... *B60W 30/09* (2013.01); *B60W 60/005* (2020.02); *B60K 35/265* (2024.01); *B60K 35/29* (2024.01); *B60K 35/60* (2024.01); *B60K 2360/195* (2024.01); *B60K 2360/797* (2024.01); *B60W 2050/007* (2013.01); *B60W 2050/143* (2013.01); *B60W 2050/146* (2013.01)

(58) Field of Classification Search
CPC ........ B60K 2370/797; B60K 2370/161; B60K 2370/167; B60K 2370/175; B60K 2370/21
See application file for complete search history.

(56) References Cited

FOREIGN PATENT DOCUMENTS

| | | | | |
|---|---|---|---|---|
| JP | 2017199299 | A | 11/2017 | |
| JP | 2018514841 | A | 6/2018 | |
| KR | 20200007868 | A * | 1/2020 | ................ B60T 7/04 |
| WO | 2016140740 | A1 | 9/2016 | |

* cited by examiner

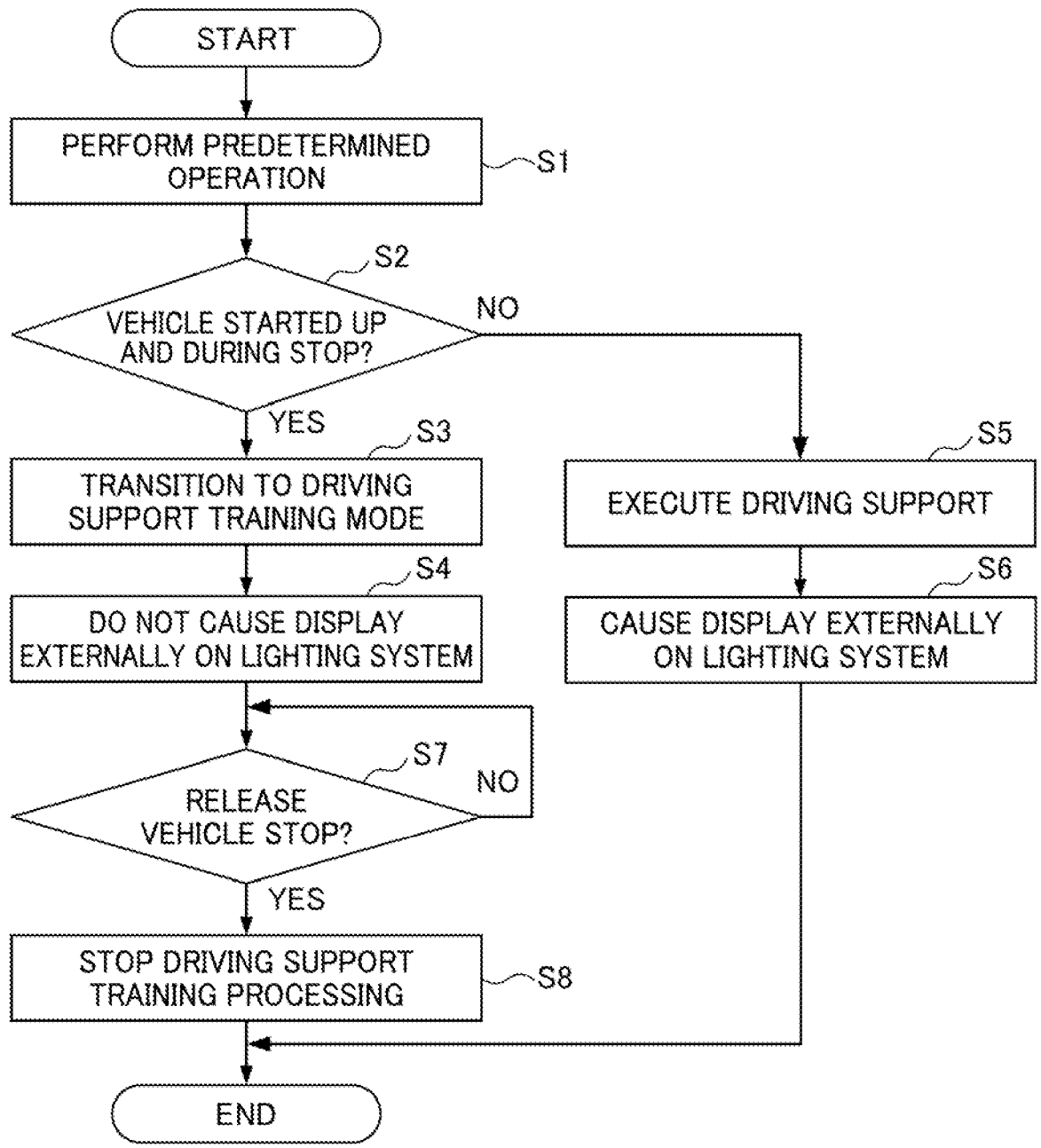

DRIVING SUPPORT DEVICE

This application is based on and claims the benefit of priority from Chinese Patent Application No. CN202110344270.4, filed on 31 Mar. 2021, the content of which is incorporated herein by reference.

BACKGROUND OF THE INVENTION

Field of the Invention

The present invention relates to a driving support device.

Related Art

Conventionally, an information processing device has been disclosed which interrupts at least part of automatic driving, and causes a driver to perform training to switching to driving by the driver of the vehicle (for example, refer to Patent Document 1).

Patent Document 1: Japanese Unexamined Patent Application, Publication No. 2017-199299

SUMMARY OF THE INVENTION

However, the information processing device disclosed in Patent Document 1 performs training during travel of the vehicle, and thus the driver of the vehicle 1 cannot calmly perform the training.

Therefore, the present invention has an object of providing a driving support device which can efficiently perform training for driving support.

A driving support device (for example, the driving support device 11 described later) according to one aspect of the present disclosure which is equipped to a moving body (for example, the vehicle 1 described later) and capable of executing driving support to control steering and/or braking of the moving body, includes: a driving support execution unit (for example, the driving support execution unit 201 described later) which executes the driving support, when a driver of the moving body performs a predetermined operation using a predetermined operator provided in the moving body; and a driving support training control unit (for example, the driving support training control unit 202 described later) which executes driving support training processing for the driver of the moving body to train the predetermined operation, in which the driving support training control unit executes the driving support training processing after the moving body has started up and while stopped.

In addition, the predetermined operator includes a brake pedal, a steering wheel, and an automatic driving execution button or indicator disposed at the steering wheel.

Furthermore, the moving body includes an external display device (for example, the lighting system 8 described later) which performs display outside of the moving body, and the driving support device further includes a display control unit (for example, the display control unit 203 described later) which controls so as to cause display externally to be performed by the external display device when any operation of the operator is performed during travel of the moving body or during execution of the driving support, and controls so as not to cause display externally to be performed by the external display device during execution of the driving support training processing.

Moreover, the driving support training control unit can train execution of collision mitigation brake of the moving body which travels towards a virtual target, in the driving support training processing; the display control unit controls so as to display on a display unit in the moving body and on the external display device that the collision mitigation brake is during operation, when operating the collision mitigation brake during travel of the moving body; and the display control unit controls so as to display on the display unit (for example, the display device 92 described later) that the collision mitigation is during operation, and so as not to cause display to be performed on the external display device, when operating the collision mitigation brake during execution of the driving support training processing.

Additionally, the driving support training control unit records data related to the driving support training processing in a portable communication device (for example, the portable communication device 100 described later) disposed in the moving body; the portable communication device executes the driving support training processing by communicating with the driving support device; and the portable communication device restricts the driving support training processing accompanying a stopped state of the moving body being released.

According to the present invention, it is possible to provide a driving support device which can efficiently perform training for driving support.

BRIEF DESCRIPTION OF THE DRAWINGS

FIG. 5 is a flowchart showing processing of the driving support device according to the present embodiment.

DETAILED DESCRIPTION OF THE INVENTION

Figure 1:
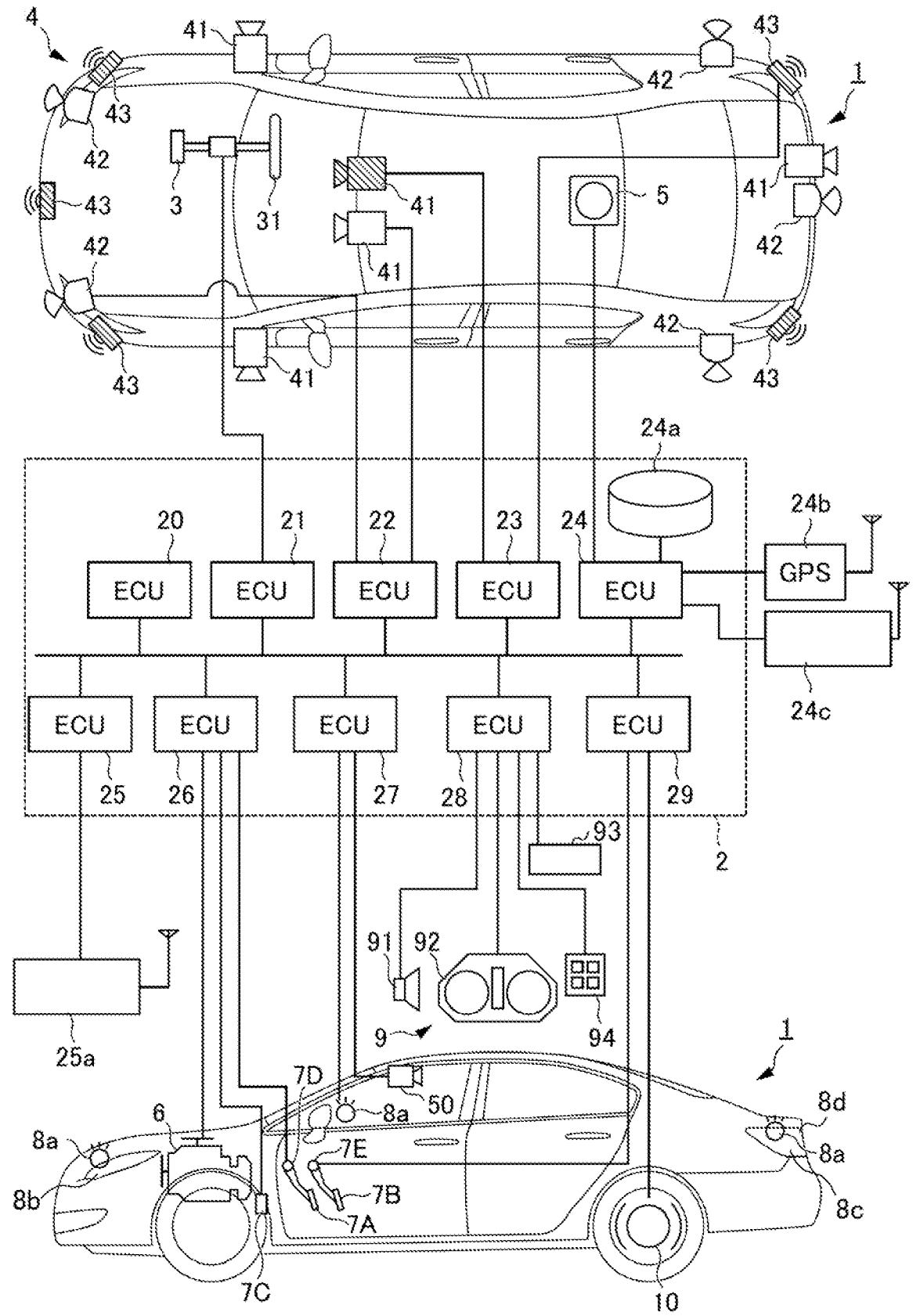
FIG. 1 is a block diagram showing the configuration of a vehicle according to the present embodiment.

Hereinafter, an embodiment of a driving support device of the present invention will be explained while referencing the drawings. FIG. 1 is a block diagram showing the configuration of a vehicle 1 according to the present embodiment. FIG. 1 shows an outline of the vehicle 1 by combining a plan view and a side view. The vehicle 1 is a four-wheeled occupant car of sedan type as one example.

The vehicle 1 includes a control device 2. The control device 2 includes a plurality of ECUs (automatic driving ECU 20~stop control ECU 29) connected to enable transmitting by way of an onboard network. Each ECU functions as a computer including a processor of which a CPU is representative, a storage device such as semiconductor memory, an interface such as an external device, etc. The program executed by a processor, and data used in processing by the processor, etc. are stored in the storage device. Each ECU may include a plurality of processors, storage devices, interfaces, etc.

Hereinafter, the function of each automatic driving ECU 20 to stop control ECU 29, etc. will be explained. It should be noted that the number of ECUs and corresponding functions can be set appropriately, and can be subdivided or integrated more than the ECUs shown in the present embodiment.

The automatic driving ECU 20 executes control for automatic driving of the vehicle 1. In automatic driving, the automatic driving ECU 20 automatically controls at least one of steering of the vehicle 1, or acceleration and deceleration.

A steering ECU 21 controls an electric power steering device 3. The electric power steering device 3 includes a mechanism which steers front wheels in response to a driving operation (steering operation) of the driver on a steering wheel 31. In addition, the electric power steering device 3 includes a motor which exerts a driving force for assisting a steering operation or automatically steering the front wheels; a sensor detecting the steering angle; etc. In the case of the driving state of the vehicle 1 being automatic driving, the steering ECU 21 automatically controls the electric power steering device 3 in response to the instruction from the automatic driving ECU 20, and controls the travel direction of the vehicle 1.

Travel support ECUs 22 and 23 perform control of a camera 41, LIDAR 42 and millimetric wave radar 43, which detect the ambient conditions of the vehicle, and information processing of detection results. The camera 41 images the front, sides and rear of the vehicle 1. In the case of the present embodiment, two of the cameras 41 are provided at the front of the vehicle 1, and one is provided to each side and the rear. The travel support ECUs 22 and 23 can extract an outline of a target, and extract dividing lines of lanes on a road (white lines, etc.), by analysis of the images captured by the camera 41.

The LIDAR 42 is Light Detection and Ranging (LIDAR), detects landmarks of the surroundings of the vehicle 1, and measures the distance from landmarks. In the case of the present embodiment, five LIDAR 42 are provided, one being provided to each corner at the front of the vehicle 1, one at the center in the rear, and one at each side in the rear.

The millimetric wave radar 43 detects landmarks of the surroundings of the vehicle 1, and measures the distance from the landmarks. In the case of the present embodiment, five millimetric wave radar 43 are provided, one being provided at the center in the front of the vehicle 1, one at each corner in the front, and one provided at each corner in the rear.

The travel support ECU 22 performs control of one camera 41 in the front of the vehicle 1 and each LIDAR 42, and information processing of detection results. The travel support ECU 23 performs control of another camera 41 in the front of the vehicle 1 and each millimetric wave radar 43, and information processing of detection results. It is possible to improve the reliability of detection results by equipping two groups of ECUs detecting the ambient conditions of the vehicle 1, and it is possible to perform multi-faceted analysis of the surrounding environment of the vehicle 1, by equipping detection units of different types such as the camera 41, LIDAR 42 and millimetric wave radar 43.

A position recognition ECU 24 performs controls of a gyro sensor 5, GPS sensor 24b and communication device 24c, and performs information processing of detection results or communication results. The gyro sensor 5 detects gyration of the vehicle 1. The position recognition ECU 24 can determine the route of the vehicle 1, according to the detection results of the gyro sensor 5, wheel speed, etc.

The GPS sensor 24b detects the current position of the vehicle 1. The communication device 24c performs wireless communication with a server that provides map information, traffic information, etc. The position recognition ECU 24 can access a database 24a of map information constructed in the storage device, and the position recognition ECU 24 performs route guidance from a current location to a destination, etc. The ECU 24, database 24a of map information and GPS sensor 24b constitute a so-called navigation device.

The communication control ECU 25 includes a communication device 25a for inter-vehicle communication. The communication device 25a performs wireless communication with other vehicles in the surroundings, and performs information exchange between vehicles.

The drive control ECU 26 controls a power plant 6. The power plant 6 is a mechanism which outputs driving force causing the drive wheels of the vehicle 1 to rotate, and includes an engine and transmission, for example. The drive control ECU 26, for example, controls the output of the engine in response to driving operation (acceleration operation or acceleration operation) of the driver detected by an operation detection sensor 7D provided to the accelerator pedal 7A. Then, the drive control ECU 26 switches the variable speed level of the transmission based on information of the vehicle speed, etc. detected by the vehicle speed sensor 7C. In the case of the driving state of the vehicle 1 being automatic driving, the drive control ECU 26 automatically controls the power plant 6 in response to the instruction from the automatic driving ECU 20, and controls acceleration/deceleration of the vehicle 1.

A vehicle external notification control ECU 27 controls a lighting system 8 (refer to FIG. 3 described later) such as directional indicators (winkers) 8a, head lights 8b, tail lights 8c and brake lamps 8d. In the case of the example of FIG. 1, the directional indicators 8a are provided at the front, door mirrors, and rear of the vehicle 1. The head lights 8b are provided to the front of the vehicle 1, and the tail lights 8c and brake lamps 8d are provided to the rear of the vehicle 1. In addition, the lighting system 8 may have an automatic driving display light (not shown) for displaying externally as executing automatic driving.

A vehicle internal notification control ECU 28 performs control of an input/output device 9. The input/output device 9 performs output of information to the driver, and reception of inputs of information from the driver. The input/output device 9 has a voice output device 91, display device 92, input device 93 and an input device 94.

The voice output device 91 notifies information by voice to the driver. The display device 92 notifies information by the display of images to the driver. The display device 92 is arranged in front of the driver's seat, and configures an instrument panel, etc. Furthermore, the input/output device 9 has a display device 93 arranged at the left side of the driver seat, and displays information from the navigation device, etc.

It should be noted that, herein, although voice and display are exemplified, the input/output device 9 may notify of information by vibration and/or light. In addition, the input/output device 9 may notify information by combining a plurality of voice, display, vibration or light. Furthermore, the input/output device 9 may differentiate the combinations according to the level of information to notify (for example, urgency), and differentiate the notification mode.

Although the input device 94 is a switch group arranged at a position operable by the driver to perform instruction to the vehicle 1, it may include a voice input device.

The stop control ECU 29 controls the brake device 10 and parking brake (not shown). The brake device 10 is a disc brake device, for example, is provided to each wheel of the vehicle 1, and causes the vehicle 1 to decelerate or stop by applying resistance to rotation of the wheels.

The stop control ECU 29, for example, controls operation of the brake device 10 in response to a driving operation (brake operation) of the driver detected by an operation detection sensor 7E provided to the brake pedal 7B. In the case of the driving state of the vehicle 1 being automatic driving, the stop control ECU 29 automatically controls the brake device 10 in response to instruction from the ECU 20, and controls deceleration and stopping of the vehicle 1. The brake device 10 and parking brake can operate in order to maintain the stopped state of the vehicle 1. In addition, in the case of the transmission of the power plant 6 including a parking lock mechanism, this parking lock mechanism can operate in order to maintain the stopped state of the vehicle 1.

The vehicle 1 further includes a driver monitor camera 50 which acquires occupant information related to occupants of the vehicle 1 as captured images. The driver monitor camera 50, for example, is configured by a digital camera made using solid-state image sensors such as CCD (Charge Coupled Device) or CMOS (Complementary Metal Oxide Semiconductor), and the type thereof is not particularly limited. The driver monitor camera 50 is arranged at the center in the left/right direction of the vehicle 1. For example, the driver monitor camera 50 may be provided in the vicinity of the display device 92, and arranged in the center in the left/right direction of the vehicle 1.

The control functions of the vehicle 1 according to the present embodiment include travel-related functions involved in the control of driving, braking and steering of the vehicle 1, and a notification functions involved in notification of information relative to the driver.

Lane maintaining control is one control of the position of the vehicle relative to a lane, and is control for causing the vehicle to automatically travel (irrespective of the driving operation of the driver) on a traveling track set in the lane. Lane deviation suppressing control is one control of the position of the vehicle relative to the lane, and is control which detects white lines or a median divider, and performs automatic steering so that the vehicle does not cross the lines. The functions differ in this way between the lane maintaining control and the lane deviation suppressing control.

Lane changing control is control which causes the vehicle to automatically move from the lane in which the vehicle is currently traveling to the adjacent lane. Forward vehicle tracking control is control which automatically follows another vehicle traveling ahead of one's own vehicle. Collision mitigation brake control is control which automatically brakes to help collision avoidance, in the case of the collision probability with an obstacle ahead of the vehicle rising. False start suppressing control is control which limits acceleration of the vehicle to suppress sudden start, in the case of the acceleration operation from the driver in a stopped state of the vehicle being at least a predetermined amount.

Adjacent vehicle notifying control is control which notifies the driver of the existence of another vehicle traveling in an adjacent lane adjacent to the travel lane of one's own vehicle, for example, notifies of the existence of another vehicle traveling ahead or behind one's own vehicle. Forward vehicle start notifying control is control notifying of one's own vehicle and another vehicle ahead of this being in the stopped state, and the other vehicle ahead starting off. These notifications can be performed by the aforementioned vehicle internal notification device.

In the present disclosure, automatic driving refers to performing part or the entirety of driving operations (acceleration, braking and steering) by the control device 2, rather than by the driver. In other words, the automatic driving not only performs the entirety of driving operations by the control device 2 (so-called full automatic driving), but includes a mode performing only part of the driving operations by the control device 2 (so-called driving support).

As examples of driving support, a cruise control function, inter-vehicle distance control (Adaptive Cruise Control (ACC)) function, lane departure prevention support (Lane Keeping Assist System (LKAS)) function, collision avoidance support function, collision mitigation brake (Collision Mitigation Brake System (CMBS)) function, etc. can be exemplified.

Figure 2:
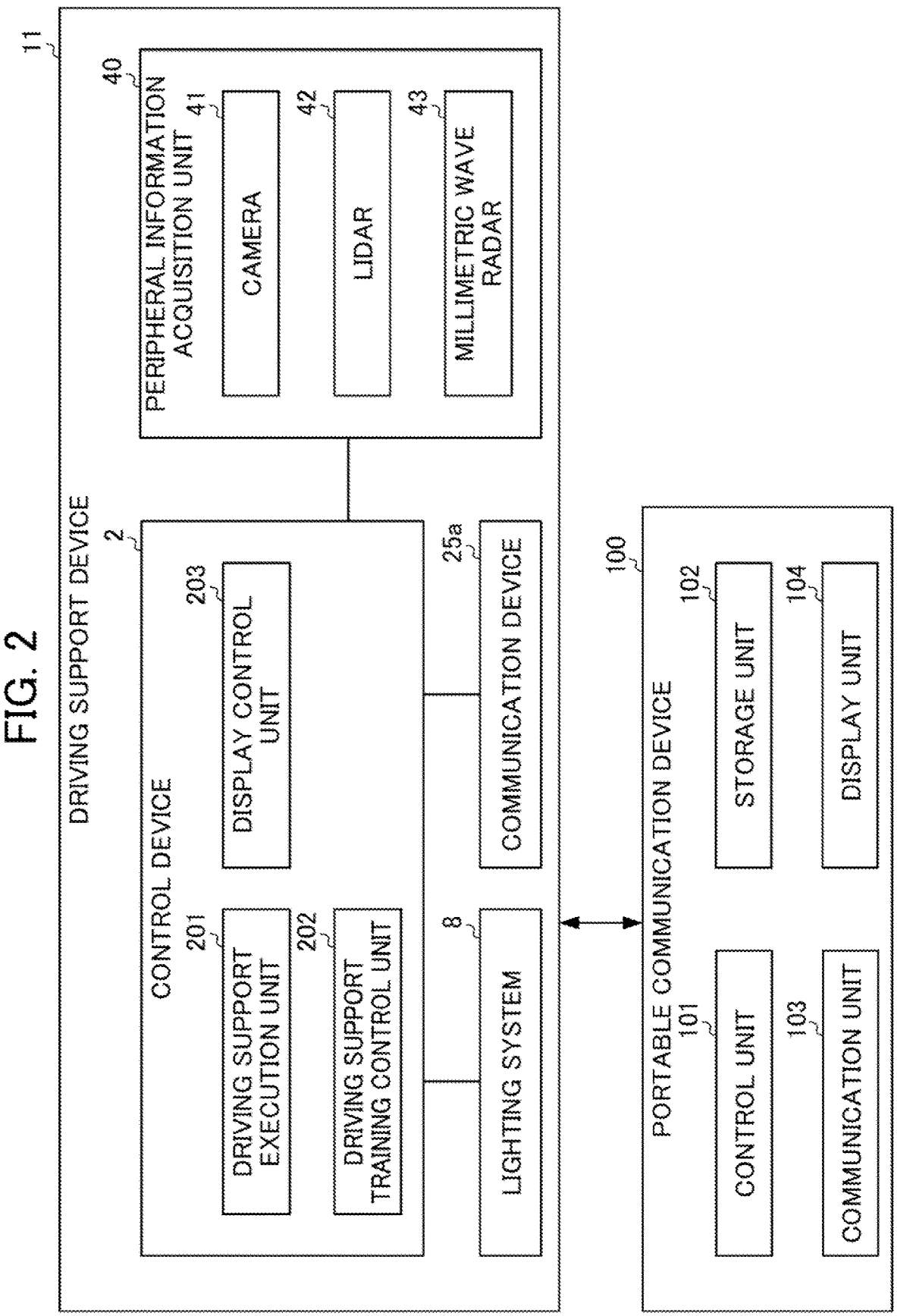
FIG. 2 is a view showing the functional configuration of a driving support device of the vehicle according to the present embodiment.

Hereinafter, processing of the driving support device 11 of the vehicle 1 according to the present embodiment will be explained. FIG. 2 is a view showing the functional configuration of the driving support device 11 of the vehicle 1 according to the present embodiment. As shown in FIG. 2, the driving support device 11 includes the control device 2, lighting system 8, communication device 25a, and peripheral information acquisition unit 40.

In addition, the driving support device 11 can wirelessly communicate with a portable communication device 100 via a communication device 25a. The portable communication device 100 includes a control unit 101, storage unit 102, communication unit 103 and display unit 104.

The control device 2 includes a driving support execution unit 201, driving support training control unit 202, and display control unit 203. The peripheral information acquisition unit 40 includes the aforementioned camera 41, LIDAR 42 and millimetric wave radar 43.

The peripheral information acquisition unit 40 acquires peripheral information of the periphery of the vehicle 1. For example, the peripheral information acquisition unit 40 acquires peripheral information of the front, sides and rear of the vehicle 1. The peripheral information is images of the periphery at the front, sides and rear of the vehicle 1 acquired by the camera 41, for example. In addition, the peripheral information may be data of the periphery at the front, sides and rear of the vehicle 1 acquired by the LIDAR 42 or millimetric wave radar 43, for example.

The control unit 101 of the portable communication device 100 is a portion which controls the portable communication device 100 overall, and realizes various functions in the present embodiment, by appropriately reading out and executing various programs stored in the storage unit 102. The control unit 101 may be a CPU (Central Processing Unit).

The storage unit 102 is a storage region of various programs for causing hardware groups to function as the portable communication device 100, various data, etc., and may be ROM, RAM, flash memory or a hard disk (HDD). More specifically, the storage unit 102 stores programs, etc. causing each function of the present embodiment to be executed in the control unit 101.

The communication unit 103 performs communication control for the portable communication device 100 to communicate with external equipment. More specifically, the communication unit 103 handles predetermined communication protocols (for example, WiFi, 3G, 4G, 5G, etc.). The communication unit 103 communicates with external equipment in accordance with the control of the control unit 101, using these communication protocols.

The portable communication device 100 can communicate with the driving support device 11 by way of the communication unit 103, and stores application programs for driving support in the storage unit 102. Then, the application programs for driving support execute processing such as the display of images and output of voice for driving support training processing, by receiving data from the driving support device 11.

A driving support execution unit 201 executes driving support when the driver of the vehicle 1 performs a predetermined operation using a predetermined operator provided in the vehicle 1. Herein, predetermined operator includes a brake pedal 7B, steering wheel 31, automatic driving execution button arranged at the steering wheel 31 or an indicator 8a, for example. In addition, the predetermined operation is an operation for executing driving support using the predetermined operator.

A driving support training control unit 202 executes driving support training processing for the driver of the vehicle 1 to train in a predetermined operation. Herein, the driving support training control unit 202 executes driving support training processing, which is after the vehicle 1 is started up (for example, after the ignition power was turned ON), and while vehicle stopped.

More specifically, the driving support training control unit 202 moves to the driving support training mode for executing driving support training processing without executing automatic driving, when the automatic driving execution button is operated, which is after the vehicle 1 is started up (for example, after the ignition power was turned ON), and while vehicle stopped.

Herein, driving support training mode is not actually executing automatic driving, but rather an operation for driving support is reflected in a virtual vehicle displayed on the display device 93.

The driving support training control unit 202 executes driving support training processing for training the driving support such as the aforementioned cruise control function, inter-vehicle distance control (Adaptive Cruise Control (ACC)) function, lane departure prevention support (Lane Keeping Assist System (LKAS)) function, collision avoidance support function, and collision mitigation brake control.

The display control unit 203 controls so as to cause display to be performed on the display device 92, as well as causing display to be performed externally by the lighting system 8 performing display on the exterior of the vehicle 1, while any operation of an operator is performed during travel of the vehicle 1 or execution of driving support. Herein, the display control unit 203 causes display indicating as being during travel or during execution of driving support on the display device 92, during travel of the vehicle 1 or during execution of driving support. In addition, the display control unit 203 causes display indicating as being during travel or during execution of driving support on the lighting system 8, during travel of the vehicle 1 or during execution of driving support.

Furthermore, the display device unit 203 controls so as to cause display to be performed on the display device 92, as well as causing display not to be performed externally on the lighting system 8, during execution of driving support training processing. In other words, the display control unit 203 performs display inside and outside of the vehicle 1, during travel of the vehicle 1 or during execution of driving support. In addition, the display control unit 203 performs display inside of the vehicle 1 during execution of the driving support training processing, but does not cause display to be performed outside of the vehicle 1.

In addition, the display control unit 203 may control so as to cause display to be performed externally only on the lighting system 8 corresponding to the operator connected to training of driving support, during execution of the driving support training processing. For example, the display control unit 203 may control so as to cause display to be performed externally only on the brake lamps 8d corresponding to the brake pedal 7B, during execution of driving support training processing for collision mitigation brake control.

In addition, the driving support training control unit 202 can train execution of collision mitigation brake in a virtual vehicle traveling towards a virtual target, in the driving support training processing. The display control unit 203, when operating the collision mitigation brake during travel of the vehicle 1, controls so as to display that the collision mitigation brake is during operation on the display device 92 and lighting system 8 (for example, brake lamps 8d) of the vehicle 1.

Furthermore, the display control unit 203, when operating the collision mitigation brake during execution of the driving support training processing, controls so as to display that the collision mitigation brake is during operation on the display device 92, and causes display not to be performed on the lighting system 8 (for example, brake lamps 8d).

In addition, the driving support training control unit 202 records data related to driving support training processing in the storage unit 102 of the portable communication device 100 arranged in the vehicle 1. The portable communication device 100 executes driving support training processing by communicating with the driving support device 11 according to the application program for driving support.

The application program for driving support limits the driving support training processing accompanying the stopped state of the vehicle 1 being released. For example, the application program for driving support ends the driving support training processing or suspends the driving support training processing, when the stopped state of the vehicle 1 is released, and the vehicle 1 starts off.

Figure 3:
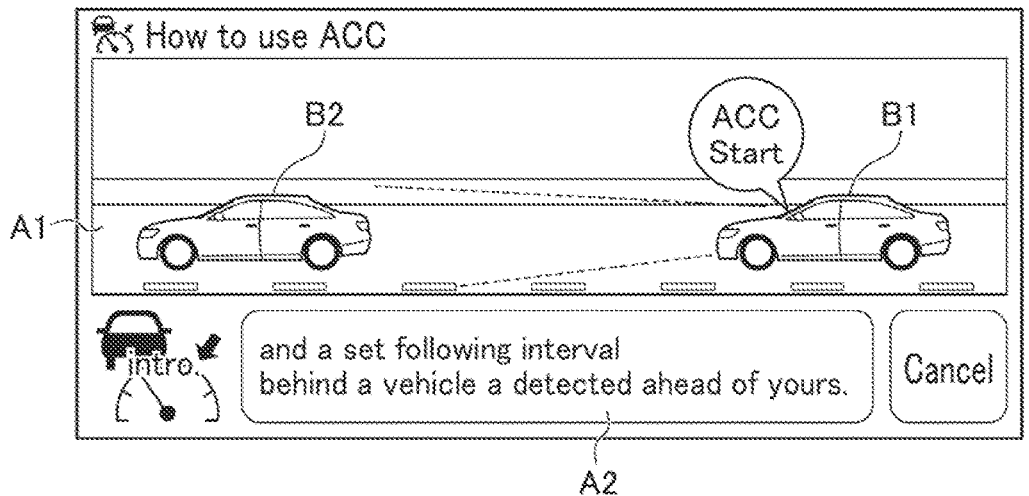
FIG. 3 is a view showing a specific example of driving support training processing.
Figure 4:
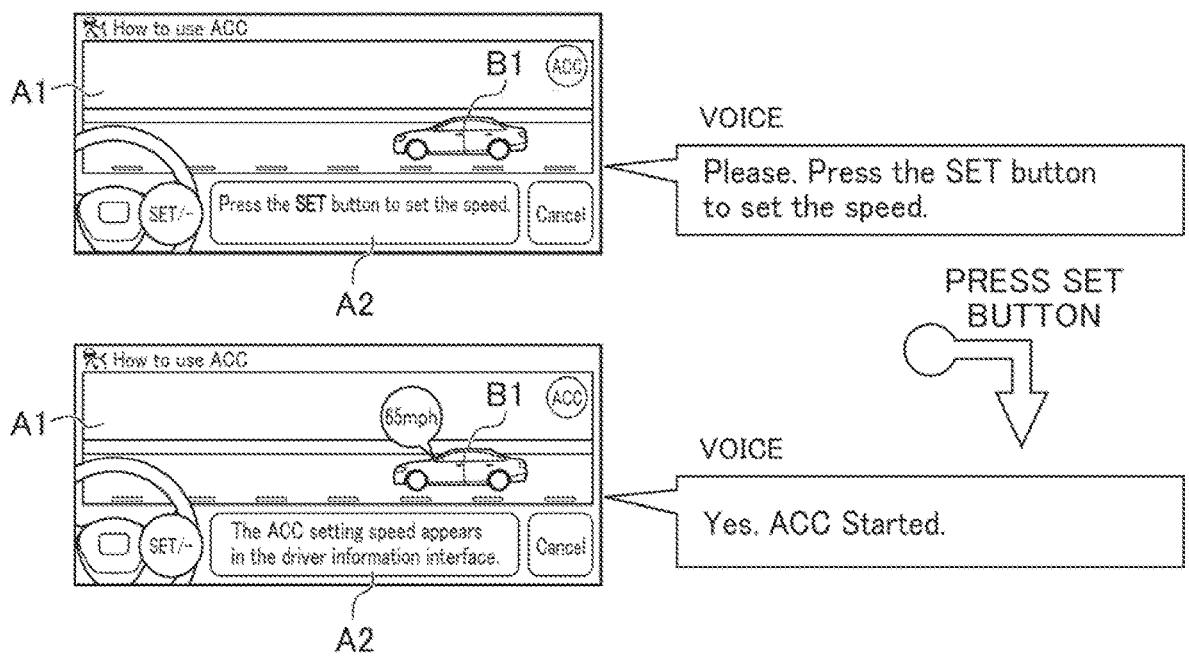
FIG. 4 is a view showing a specific example of driving support training processing.

FIGS. 3 and 4 are views showing specific examples of driving support training processing. As shown in FIG. 3, the display control unit 203 causes a screen A1 and screen A2 to be displayed on the display device 93 in the driving support training mode. The screen A1 displays a virtual own vehicle B1 and virtual other vehicle B2 in travel on a road. The screen A2 displays messages, etc. to the driver.

In addition, as shown in FIG. 4, the display control unit 203 performs display for driving support on the display device 93, and causes a voice to be outputted by the voice output device 91. More specifically, at the top of FIG. 4, the screen A1 displays the virtual own vehicle B1, and the screen A2 displays a message prompting operation of a SET button (inter-vehicle distance control (ACC) execution button). Furthermore, the voice output device 91 prompts the driver to operate the SET button by voice.

Then, when the SET button is operated, at the bottom of FIG. 4, the screen A1 displays that the virtual own vehicle B1 executes inter-vehicle distance control (ACC), and the screen A2 displays a message during execution of inter-vehicle distance control (ACC). Furthermore, the voice output device 91 reports that the inter-vehicle distance control (ACC) is being executed by voice.

In addition, in the above-mentioned example, although executing inter-vehicle distance control (ACC), for example, as mentioned above, the driving support training control unit 202 can train execution of collision mitigation brake in the virtual own vehicle B1 traveling towards the virtual other vehicle B2, in the driving support training processing. The driver can perform training for driving support by the display device 93 displaying a screen, and the voice output device 91 outputting a voice, in the driving support training processing.

FIG. 5 is a flowchart showing the processing of the driving support device 11 according to the present embodiment. In Step S1, the driver of the vehicle 1 performs a predetermined operation using a predetermined operator (for example, automatic driving execution button) provided in the vehicle 1.

In Step S2, the driving support training control unit 202 determines whether being after the vehicle 1 started up (for example, after the ignition power was turned ON), and during vehicle stop. In the case of being after the vehicle 1 started up, and during vehicle stop (YES), the processing advances to Step S3. On the other hand, in the case of the vehicle 1 not starting up, and/or not being stopped (NO), the processing advances to Step S5.

In Step S3, the driving support training control unit 202 moves to driving support training mode for executing driving support training processing, without executing automatic driving. In Step S4, the display control unit 203 controls so as to cause display to be performed on the display device 92, and not to cause display externally to be performed on the lighting system 8, during execution of the driving support training processing.

In Step S5, the driving support execution unit 201 executes driving support of the vehicle 1. In Step S6, it controls so as to cause display to be performed on the display device 92, and cause display externally to be performed on the lighting system 8.

In Step S7, the driving support training control unit 202 determines whether the stopped state of the vehicle 1 has been released. In the case of the stopped state being released (YES), the processing advances to Step S8. On the other hand, in the case of the stopped state not being released (NO), the processing repeats Step S7. In Step S8, the driving support training control unit 202 ends the driving support training processing or interrupts driving support training processing, when the stopped state of the vehicle 1 is released, and the vehicle 1 starts off.

According to the present embodiment, for example, the following effects are exerted. The driving support device 11 is equipped to the vehicle 1 and can execute driving support for steering and/or braking of the vehicle 1, and includes: the driving support execution unit 201, and executes the driving support when the driver of the vehicle 1 performs a predetermined operation using a predetermined operator provided in the vehicle 1; and the driving support training control unit 202 which executes driving support training processing for the driver of the vehicle 1 to train in the predetermined operation, in which the driving support training control unit 202 executes the driving support training processing after the vehicle 1 starts up and during vehicle stop.

In this way, the driving support device 11 uses an actual vehicle 1 and can perform training of driving support in a state imitating being during travel, by executing the driving support training processing after the vehicle 1 has started up and during vehicle stop. In particular, since the driving support is a function which can be executed by the vehicle 1 only during travel, the driving support device 11 can provide sufficient training to the driver and efficiently perform training for driving support. In addition, the driver can execute driving support with margin during actual travel, by executing driving support training processing.

In addition, the predetermined operator, for example, includes the brake pedal 7B, steering wheel 31, and automatic driving execution button or indicator 8a arranged at the steering wheel 31. The driving support device 11 can thereby execute driving support and driving support training processing according to the operation of a predetermined operator.

In addition, the vehicle 1 includes the lighting system 8 which performs display outside of the vehicle 1, the driving support device 11 further includes the display control unit 203 which controls so as to cause display externally to be performed by the lighting system 8 while any operation of operators is performed during travel of the vehicle 1 or during execution of driving support, and controls so as not to cause display externally to be performed by the lighting system 8 during execution of driving support training processing.

The driving support device 11 can thereby notify externally as being during travel of the vehicle 1 or being during execution of the driving support, during travel of the vehicle 1 or during execution of the driving support. Furthermore, the driving support device 11 can perform training of driving support, without unnecessarily alerting other vehicles or the like, by controlling so as not to perform display externally during execution of the driving support training processing.

In addition, the driving support training control unit 202 can train the execution of collision mitigation brake in the vehicle 1 which is traveling towards a virtual target in the driving support training processing, and the display control unit 203 controls so as to display on the display device 92 of the vehicle 1 and lighting system 8 that the collision mitigation brake is during operation, when operating the collision mitigation brake during travel of the vehicle 1. Furthermore, the display control unit 203 controls so as to display on the display device 92 that the collision mitigation brake is during operation, and not to cause display to be performed by the lighting system 8, when operating the collision mitigation brake during execution of the driving support training processing.

The driving support device 11 can thereby notify as operating the collision mitigation brake to outside, in the case of operating the collision mitigation brake during travel. In addition, the driving support device 21 can perform training of driving support without unnecessarily alerting other vehicles and the like, by not causing display externally to be performed, in the case of operating the collision mitigation brake during execution of the driving support training processing.

In addition, the driving support training control unit 202 records data related to the driving support training processing in the portable communication device 100 arranged in the vehicle 1, and the portable communication device 100 executes the driving support training processing by communicating with the driving support device 11, and the portable communication device 100 restricts the driving support training processing accompanying the stopped state of the vehicle 1 being released.

The driving support device 11 can thereby cause display and voice related to driving support training processing, as well as data related to driving support training processing to be outputted from the portable communication device 100. Furthermore, the driving support device 11 can stably execute the end or interruption of driving support training processing, by restricting the driving support training processing, accompanying the stopped state of the vehicle 1 being released.

Although an embodiment of the present invention has been explained above, the above-mentioned driving support device 11 can be realized by hardware, software or a combination of these. In addition, the control method performed by the above-mentioned driving support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes various types of tangible storage media. Examples of non-transitory computer readable media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although an embodiment of the present invention has been explained above, the present invention is not to be limited thereto. The configurations of detailed parts may be modified as appropriate within the scope of the gist of the present invention.

EXPLANATION OF REFERENCE NUMERALS 1 vehicle
2 control device
11 driving support device
201 driving support execution unit
202 driving support training control unit
203 display control unit

What is claimed is:

1. A driving support device equipped to a moving body, and which executes driving support to control steering and/or braking of the moving body, the driving support device comprising:
   a driving support execution unit which executes the driving support, when a driver of the moving body performs a predetermined operation using a predetermined operator provided in the moving body; and
   a driving support training control unit which executes driving support training processing for the driver of the moving body to train the predetermined operation,
   wherein the driving support training control unit executes the driving support training processing after the moving body has started up and while stopped,
   wherein the predetermined operator includes a brake pedal, a steering wheel, and an automatic driving execution button or indicator disposed at the steering wheel,
   wherein the moving body includes an external display device which performs display outside of the moving body, and
   wherein the driving support device further includes a display control unit which controls so as to cause display externally to be performed by the external display device when any operation of the operator is performed during travel of the moving body or during execution of the driving support, and controls so as not to cause display externally to be performed by the external display device during execution of the driving support training processing.

2. The driving support device according to claim 1,
   wherein the driving support training control unit can train execution of collision mitigation brake of the moving body which travels towards a virtual target, in the driving support training processing,
   wherein the display control unit controls so as to display on a display unit in the moving body and on the external display device that the collision mitigation brake is during operation, when operating the collision mitigation brake during travel of the moving body, and
   wherein the display control unit controls so as to display on the display unit that the collision mitigation is during operation, and so as not to cause display to be performed on the external display device, when operating the collision mitigation brake during execution of the driving support training processing.

3. A driving support device equipped to a moving body, and which executes driving support to control steering and/or braking of the moving body, the driving support device comprising:
   a driving support execution unit which executes the driving support, when a driver of the moving body performs a predetermined operation using a predetermined operator provided in the moving body; and
   a driving support training control unit which executes driving support training processing for the driver of the moving body to train the predetermined operation,
   wherein the driving support training control unit executes the driving support training processing after the moving body has started up and while stopped,
   wherein the driving support training control unit records data related to the driving support training processing in a portable communication device disposed in the moving body,
   wherein the portable communication device executes the driving support training processing by communicating with the driving support device, and
   wherein the portable communication device restricts the driving support training processing accompanying a stopped state of the moving body being released.

* * * * *